(12) United States Patent
Jiang et al.

(10) Patent No.: US 11,272,505 B2
(45) Date of Patent: Mar. 8, 2022

(54) METHOD AND APPARATUS FOR PERFORMING FRACTIONAL SUBFRAME TRANSMISSION

(71) Applicant: NEC CORPORATION, Tokyo (JP)

(72) Inventors: Lei Jiang, Beijing (CN); Hongmei Liu, Beijing (CN); Gang Wang, Beijing (CN); Zhennian Sun, Beijing (CN); Chuangxin Jiang, Beijing (CN)

(73) Assignee: NEC CORPORATION, Tokyo ( * ) Notice: Subject to any disclaimer, the term of this patent is extended or adjusted under 35 U.S.C. 154(b) by 0 days.

(21) Appl. No.: 16/692,407

(22) Filed: Nov. 22, 2019

(65) Prior Publication Data

US 2020/0146001 A1 May 7, 2020

Related U.S. Application Data

(63) Continuation of application No. 15/302,066, filed as application No. PCT/CN2015/072144 on Feb. 3, 2015, now Pat. No. 10,512,077.

(51) Int. Cl.
*H04W 72/04* (2009.01)
*H04W 74/08* (2009.01)
*H04L 5/00* (2006.01)
*H04W 48/12* (2009.01)

(52) U.S. Cl.
CPC ....... *H04W 72/0446* (2013.01); *H04L 5/0053* (2013.01); *H04L 5/0096* (2013.01); *H04W 74/0808* (2013.01); *H04L 5/0094* (2013.01); *H04W 48/12* (2013.01)

(58) Field of Classification Search
CPC ......... H04W 72/0446; H04W 74/0808; H04W 48/12; H04W 74/002; H04L 5/0096; H04L 5/0053; H04L 5/0094
See application file for complete search history.

(56) References Cited

U.S. PATENT DOCUMENTS

| 8,457,079 | B2 | 6/2013 | Krishnamurthy et al. |
| 8,576,807 | B2 | 11/2013 | Malladi |
| 2011/0103315 | A1 | 5/2011 | Camp, Jr. et al. |
| 2012/0128095 | A1 | 5/2012 | Kwon et al. |

(Continued)

FOREIGN PATENT DOCUMENTS

| CN | 102036376 A | 4/2011 |
| CN | 103109472 A | 5/2013 |

(Continued)

OTHER PUBLICATIONS

Alcatel-Lucent Shanghai Bell, Alcatel-Lucent, LBT Enhancements for Licensed-Assisted Access, Nov. 17-21, 2014, 3GPP TSG RAN WG1 Meeting #79, R1-144701.*

(Continued)

*Primary Examiner* — Hashim S Bhatti
(74) *Attorney, Agent, or Firm* — Sughrue Mion, PLLC

(57) ABSTRACT

Embodiments of the disclosure provide a method and apparatus for performing fractional subframe transmission. The method may comprise: determining first temporal information that indicates when a channel becomes available; and determining, based on the first temporal information and transmission opportunity information, second temporal information that indicates an end of the fractional subframe transmission.

15 Claims, 7 Drawing Sheets

(56) References Cited

U.S. PATENT DOCUMENTS

| | | | |
|---|---|---|---|
| 2014/0003387 A1 | 1/2014 | Lee et al. | |
| 2014/0031054 A1 | 1/2014 | Zou et al. | |
| 2014/0112289 A1 | 4/2014 | Kim et al. | |
| 2014/0126530 A1 | 5/2014 | Siomina et al. | |
| 2014/0140298 A1 | 5/2014 | Han et al. | |
| 2014/0341018 A1 | 11/2014 | Bhushan et al. | |
| 2016/0095114 A1 | 3/2016 | Kim et al. | |
| 2016/0174222 A1 | 6/2016 | Zhang et al. | |
| 2016/0278003 A1 | 9/2016 | Kim et al. | |
| 2017/0237463 A1 | 8/2017 | Zheng et al. | |
| 2017/0318607 A1 | 11/2017 | Tiirola et al. | |
| 2017/0367123 A1* | 12/2017 | Wang | H04W 48/18 |
| 2018/0175975 A1* | 6/2018 | Um | H04W 72/14 |

FOREIGN PATENT DOCUMENTS

| | | |
|---|---|---|
| CN | 104303573 A | 1/2015 |
| EP | 3 142 299 A1 | 3/2014 |
| EP | 2 757 850 A1 | 7/2014 |
| EP | 2 757 850 B1 | 8/2018 |
| EP | 3 142 299 B1 | 9/2019 |
| KR | 101479336 B1 | 1/2015 |
| KR | 1020150006050 A | 1/2015 |
| WO | 2010/081390 A1 | 7/2010 |
| WO | 2011/122763 A2 | 10/2011 |
| WO | 2012/078565 A1 | 6/2012 |
| WO | 2013/169966 A1 | 11/2013 |
| WO | 2016121581 A1 | 8/2016 |

OTHER PUBLICATIONS

Communication dated Jul. 12, 2018, issued by the Australian Patent Office in application No. 2017258846.
Communication dated Mar. 23, 2020, issued by the Patent Office of the People's Republic of China in application No. 201580030347.3.
Communication dated Apr. 3, 2020, from the European Patent Office in European Application No. 15880698.4.
Kyocera, "Further considerations on the essential functionalities for LAA", 3GPP TSG RAN WG1 Meeting #79, Nov. 17-21, 2014, R1-144955, Internet <URL:http://www.3gpp.org/ftp/tsg_ran/WG1_RL1/TSGR1_79/Docs/R1-144955.zip>, total 11 pages.
Communication dated Nov. 7, 2016, from the Australian Patent Office in counterpart application No. 2015381655.
Communication dated Apr. 8, 2019 from the European patent Office in counterpart Application No. 15 880 698.4.
Communication dated Sep. 29, 2017 from the European Patent Office in counterpart European application No. 15880698.4.
Communication dated Mar. 29, 2019 from the Patent Office of the People's Republic of China in counterpart Application No. 201580030347.3.
Communication dated Sep. 3, 2019, from the State Intellectual Property Office of the P.R.C in application No. 201580030347.3.
International Search Report of PCT/CN2015/072144 dated Oct. 19, 2015.
Communication dated Mar. 19, 2019 issued by the Japanese Patent Office in counterpart Application No. 2018-128264.
Communication dated Oct. 10, 2017 from the Japanese Patent Office in counterpart Application No. 2016-564227.
Communication dated Nov. 1, 2016, issued by the Korean Intellectual Property Office in corresponding Korean Application No. 10-2016-7027867.
Alcatel-Lucent et al., 'LBT Enhancements for Licensed-Assisted Access', 3GPP TSG RAN WG1 Meeting #79, R1-144701, Agenda Item: 6.3.2.2, San Francisco, USA, Nov. 17-21, 2014. (5 pages total).
Communication dated Feb. 12, 2019 issued by the Indian Intellectual Property Office in counterpart Application No. 201617032043.
Communication dated Aug. 25, 2020, from the Japanese Patent Office in application No. 2019-128037.
Intel Corporation, "Discussion on PHY layer options for LAA using LTE", 3GPP TSG RAN WG1 Meeting #79, R1-144666, San Francisco, USA, Nov. 17-21, 2014, pp. 1-6 (7 pages).
Communication dated May 11, 2021, issued by the Japanese Patent Office in application No. 2019-128037.
Beluri et al., "Mechanisms for LTE Coexistence in TV White Space", 2012 IEEE International Symposium on Dynamic Spectrum Access Networks, Oct. 16, 2012 (10 pages total).
Search Report dated Aug. 23, 2017 by Registered Search Organization (Pasona Group Inc.) in Japanese Patent Application No. 2016-564227.

* cited by examiner

100↘

```
┌─────────────────────────────────────────────────────────────┐
│ Determine first temporal information that indicates when a  │  ─ S110
│ channel becomes available                                   │
└─────────────────────────────────────────────────────────────┘
                              ↓
┌─────────────────────────────────────────────────────────────┐
│ Determine, based on the first temporal information and      │
│ transmission opportunity information, second temporal       │  ─ S120
│ information that indicates an end of the fractional         │
│ subframe transmission                                       │
└─────────────────────────────────────────────────────────────┘
```

FIG. 1

METHOD AND APPARATUS FOR PERFORMING FRACTIONAL SUBFRAME TRANSMISSION

CROSS REFERENCE TO RELATED APPLICATIONS

This application is a continuation of U.S. application Ser. No. 15/302,066 filed on Oct. 5, 2016, which is a National Stage of International Application No. PCT/CN2015/072144 filed Feb. 3, 2015, the contents of which are incorporated herein by reference in their entirety.

FIELD OF THE INVENTION

Embodiments of the present invention generally relate to communication techniques. More particularly, embodiments of the present invention relate to a method and apparatus for performing fractional subframe transmission.

BACKGROUND OF THE INVENTION

In 3rd Generation Partnership Project (3GPP), the network structure and various technologies needed for a terminal's movement between a 3GPP wireless communication network and a Wireless Local Area Network (WLAN) network are called interworking WLAN. The multi-mode wireless communication technology has evolved to use multiple wireless communication technologies at the same time. The use of multiple wireless communication technologies simultaneously thereby increases transfer rates per unit time or improves the reliability of the terminal.

In wireless communication, spectrum is very rare resource. A licensed band represents a frequency band that is exclusively licensed to a specific operator to provide specific wireless services. On the other hand, an unlicensed band represents a frequency band that is not allocated to a specific operator, but is opened so that all entities meeting the predefined requirements may use the frequency band.

In some regions in the world, unlicensed band technologies need to abide to certain regulations, for example, Listen-Before-Talk (LBT), and channel bandwidth occupancy requirements. LBT results in an uncertainty of channel availability. For instance, an unlicensed band may be available at any time during a subframe.

WLAN that uses Wireless Fidelity (WiFi) is the typical wireless communication technology used in the unlicensed band. Time granularity of current Long Term Evolution (LTE) is much larger than that of WiFi, which leads to the low competitive strength of License Assisted Access (LAA) with LBT. As such, fair coexistence between LTE and other technologies such as WiFi as well as between LTE operators is expected. In order to be more competitive in the unlicensed band, fractional subframe transmission may be performed.

The fractional subframe transmission may use at least one fractional subframe. Since merely a portion of symbols of a factional subframe are available for data transmission, the end of the fractional subframe transmission may be uncertain. However, for both a transmitter and a receiver, the end of the fractional subframe transmission is an important factor for perform the fractional subframe transmission efficiently. Therefore, there is a need to estimate the end of the fractional subframe transmission.

SUMMARY OF THE INVENTION

The present invention proposes a solution regarding fractional subframe transmission. Specifically, the present invention provides a method and apparatus for estimate the end of the fractional subframe transmission.

According to a first aspect of embodiments of the present invention, embodiments of the invention provide a method for performing fractional subframe transmission. The method may comprise: determining first temporal information that indicates when a channel becomes available; and determining, based on the first temporal information and transmission opportunity information, second temporal information that indicates an end of the fractional subframe transmission. The method may be performed at a transmitter or a receiver.

According to a second aspect of embodiments of the present invention, embodiments of the invention provide an apparatus for performing fractional subframe transmission. The apparatus may comprise: a first determining unit configured to determine first temporal information that indicates when a channel becomes available; and a second determining unit configured to determine, based on the first temporal information and transmission opportunity information, second temporal information that indicates an end of the fractional subframe transmission. The apparatus may be implemented at a transmitter or a receiver.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where FIG. 1 illustrates a flow chart of a method 100 for performing fractional subframe transmission according to an embodiment of the invention;

Throughout the figures, same or similar reference numbers indicate same or similar elements.

DETAILED DESCRIPTION OF EMBODIMENTS

Figure 2:
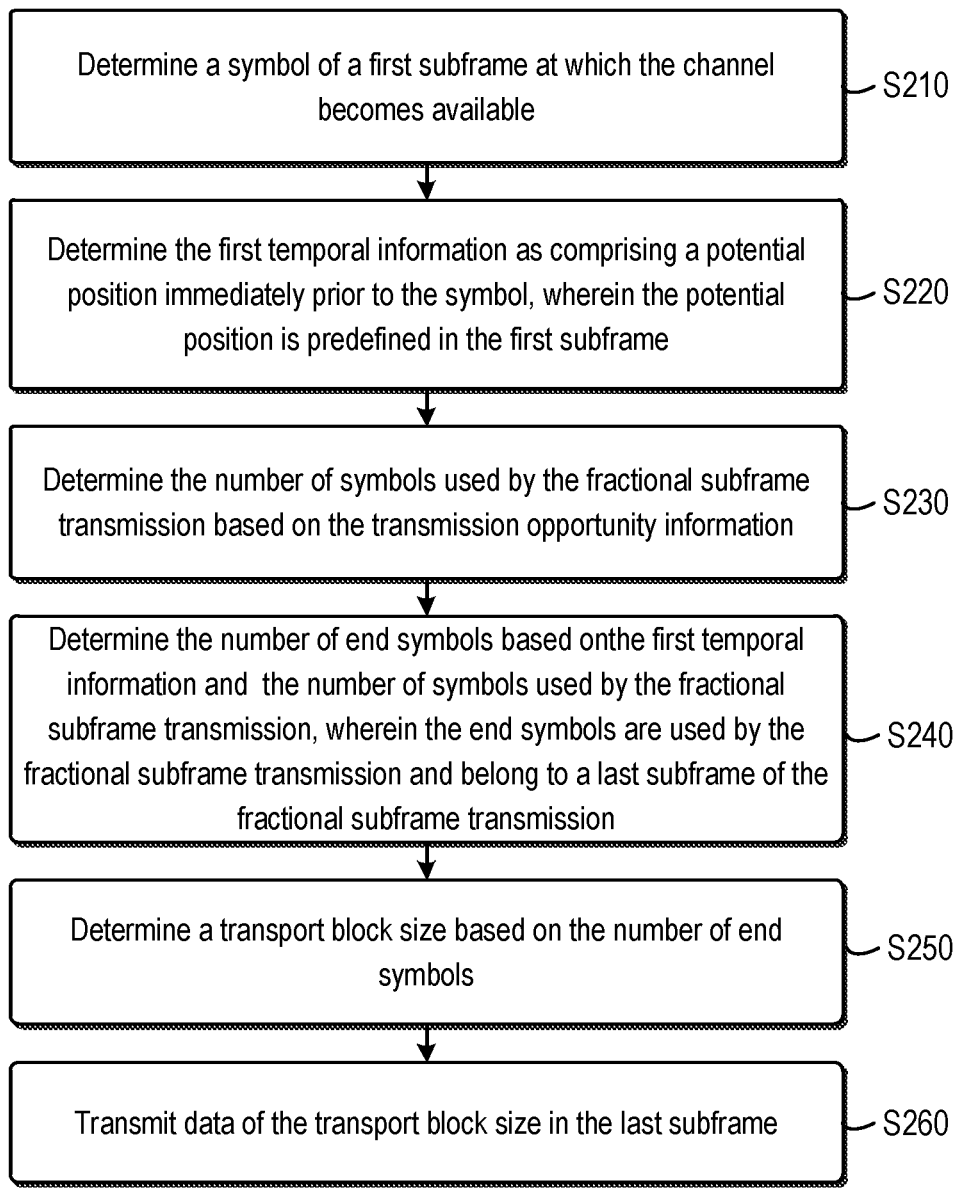
FIG. 2 illustrates a flow chart of a method 200 for performing fractional subframe transmission at a transmitter according to an embodiment of the invention.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

Embodiments of the present invention are directed to a solution for performing fractional subframe transmission. The solution may be carried out between a receiver and a transmitter. In particular, the transmitter may determine first temporal information that indicates when a channel becomes available and determine second temporal information that indicates an end of the fractional subframe transmission based on the first temporal information and transmission opportunity information. The receiver may determine the second temporal information in a similar way. As such, both the transmitter and the receiver may determine the end of the fractional subframe transmission without introducing signalling overhead.

In embodiments of the present invention, a fractional subframe may refer to a subframe for downlink transmission or a subframe for uplink transmission, wherein one part of the fractional subframe is used for transmission of control information or data and the other part is not used for the transmission. For example, for a subframe comprising 14 symbols, if only the last 6 symbols are used for transmission while the first 8 symbols are not used for the transmission, this subframe may be considered as a factional subframe. For another example, if the first 7 symbols of a subframe are used for transmission while the remaining symbols of the subframe are not used for the transmission, this subframe may be considered as a factional subframe as well.

In the disclosure, the fractional subframe transmission may refer to the transmission performed on one or more subframes, and at least one of the one or more subframes is a fractional subframe. By way of example, the fractional subframe transmission may comprise various cases, such as the first subframe being a fractional subframe, the last subframe being a fractional subframe, both the first and the last subframes being fractional subframes, and the like.

In some embodiments, the fractional subframe transmission may be downlink or uplink cellular transmission. In downlink transmission, the receiver may comprise user equipment (UE), such as a terminal, a Mobile Terminal (MT), a Subscriber Station (SS), a Portable Subscriber Station (PSS), Mobile Station (MS), or an Access Terminal (AT). Meanwhile, the transmitter may comprise a base station (BS), such as a node B (NodeB or NB), or an evolved NodeB (eNodeB or eNB). In uplink transmission, the transmitter may comprise a UE and the receiver may comprise a BS.

According to some other embodiments of the present invention, the fractional subframe transmission may be D2D transmission. In this regard, the receiver may be a Device-to-Device (D2D) receiver and the transmitter may be a D2D transmitter.

Embodiments of the present invention may be applied in various communication systems, including but not limited to a Long Term Evolution (LTE) system or a Long Term Evolution Advanced (LTE-A) system. Given the rapid development in communications, there will of course also be future type wireless communication technologies and systems with which the present invention may be embodied. It should not be seen as limiting the scope of the invention to only the aforementioned system.

Now some exemplary embodiments of the present invention will be described below with reference to the figures. Reference is first made to FIG. 1, which illustrates a flow chart of a method 100 for performing fractional subframe transmission at a transmitter according to an embodiment of the invention. The method 100 may be performed at a transmitter and other suitable device. Alternatively, the method 100 may be performed at a receiver and other suitable device.

The method 100 starts at step S110, in which first temporal information is determined, wherein the first temporal information indicates when a channel becomes available.

In context of the disclosure, a subframe may comprise a plurality of symbols. By way of example, a subframe may be 1 ms and comprise 14 symbols, for example, symbols 0 to 13. A position, such as a potential position, a target position, a current position, a next position, may refer to a time point or a time period in the subframe. In some embodiments, a position may correspond to an instant in a subframe. As an alternative, a position may correspond to a symbol of a subframe. In this regard, the position may occupy a time period, for example, the time period of a symbol. A target position may refer to a position from which the fractional transmission may start, and a potential position may refer to a predefined position that is a candidate of the target position.

There may be one or more potential positions predefined in a subframe. Each of the potential positions may correspond to a symbol of the subframe periodically or aperiodically. In some embodiments, the potential positions may comprise every three symbols, for example, symbols 0, 3, 6, 9 and 12. For instance, the potential positions may be set at $$\mathrm{mod}(N, Nd) = x (x \in [0, Nd-1]), \quad (1)$$

where N represents the index of a symbol in a subframe, and Nd represents the interval between two potential positions and may be an integer ranged from 1 to the total number of symbols in the subframe, for example 14. According to equation (1), it may be determined that the smaller the Nd is, the denser the potential positions are. In some embodiments, each symbol in a subframe may be predefined as a potential position.

It is to be noted that the above examples are illustrated for example, rather than limitation. It can be appreciated that, in alternative embodiments, there may be aperiodic configurations of the potential positions. For instance, the potential positions may correspond to the symbols 0, 3, 8 and 12.

Clear Channel Assessment (CCA) or Extended Clear Chanel Assessment (eCCA) may be performed, for example by the transmitter, to detect whether a channel is available. In response to detecting that the channel becomes available, whether a current position is a potential position may be detected. If the current position is a potential position, the current position may be determined as the target position; otherwise, a channel occupation signal may be transmitted from the current position until a potential position, and this potential position may be determined as the target position. In some embodiments, this potential position may be a potential position immediately following the current position. For example, if the current position corresponds to symbol 5, and there are three predefined potential positions corresponding to symbols 0, 7 and 11, it may be determined that the potential position corresponding to symbol 7 is a potential position immediately following the current position and may be determined as the target position.

According to embodiments of the present invention, the fractional subframe transmission may be symbol-level transmission. In other words, the fractional subframe transmission may be ended at any symbol of a subframe. In this case, it is possible that the last subframe of the fractional subframe transmission is a fractional subframe. The first temporal information may be determined in several ways. In some embodiments, whether the channel becomes available at a symbol of a first subframe may be determined. In response to determining that the channel becomes available, the first temporal information may be determined as comprising an index of the symbol. Alternatively, in some embodiments, in response to determining that the channel becomes available, the first temporal information may be determined as comprising a potential position predefined in the first subframe, wherein the potential position is immediately prior to the symbol. Details will be described with reference to FIGS. 2 and 3.

Alternatively, the fractional subframe transmission may be subframe-level transmission. In this case, the fractional subframe transmission may be ended at a complete subframe. In other words, the last subframe of the fractional subframe transmission is a complete subframe, instead of a fractional subframe. According to embodiments of the present invention, at step S110, a first subframe at which the channel becomes available may be determined. Then, the first temporal information may be determined as comprising an index of the first subframe.

In some embodiments, step S110 may be performed by the transmitter. In this case, the first subframe may be determined based on CCA/eCCA performed by the transmitter. In particular, when the transmitter detect a channel becomes available at a subframe, this subframe may be determined as the first subframe.

In some other embodiments, step S110 may be performed by the receiver. In an exemplary embodiment, the transmitter may notify the first temporal information, for example, by sending an indicator regarding the first temporal information to the receiver. In this way, the index of the first subframe at which a channel becomes available may be indicated explicitly. Thus, at step S110, the receiver may determine the first temporal information by detecting the indicator. In an alternative embodiment, the transmitter may not send the indicator, and the receiver may make blind decoding for control information of the fractional subframe transmission at a potential position. In response to that the blind decoding is success, the receiver may determine the index of the first subframe of the fractional subframe transmission.

At step S120, second temporal information that indicates an end of the fractional subframe transmission may be determined based on the first temporal information and transmission opportunity information.

According to embodiments of the present invention, the transmission opportunity information may include channel occupancy time, for example, maximum channel occupancy time, average channel occupancy time, and so on. The transmission opportunity information may be determined based on regulations or other possible aspects. Additionally or alternatively, the transmission opportunity information may be configured by higher layer signalling or may be preset as being fixed.

In some embodiments where the symbol-level transmission is performed, at step S120, a number of symbols used by the fractional subframe transmission may be determined based on the transmission opportunity information. Then, a number of end symbols may be determined based on the first temporal information and the number of symbols used by the fractional subframe transmission, wherein the end symbols are used by the fractional subframe transmission and belong to a last subframe of the fractional subframe transmission. Details will be described with reference to FIGS. 2 and 3.

Alternatively, in some embodiments where the subframe-level transmission is performed, at step S120, an index of a last subframe used by the fractional subframe transmission may be determined based on the first temporal information and transmission opportunity information.

In an exemplary embodiment, the index of the last subframe may be determined as follows:

$$Ne=N1+\text{floor}(TXOP)-1 \qquad (2)$$

where N1 represents the index of the first subframe, Ne represents the index of the last subframe, TXOP represents the channel occupancy time in millisecond (i.e., ms), and floor( ) indicates an operation of rounding down.

Figure 6:
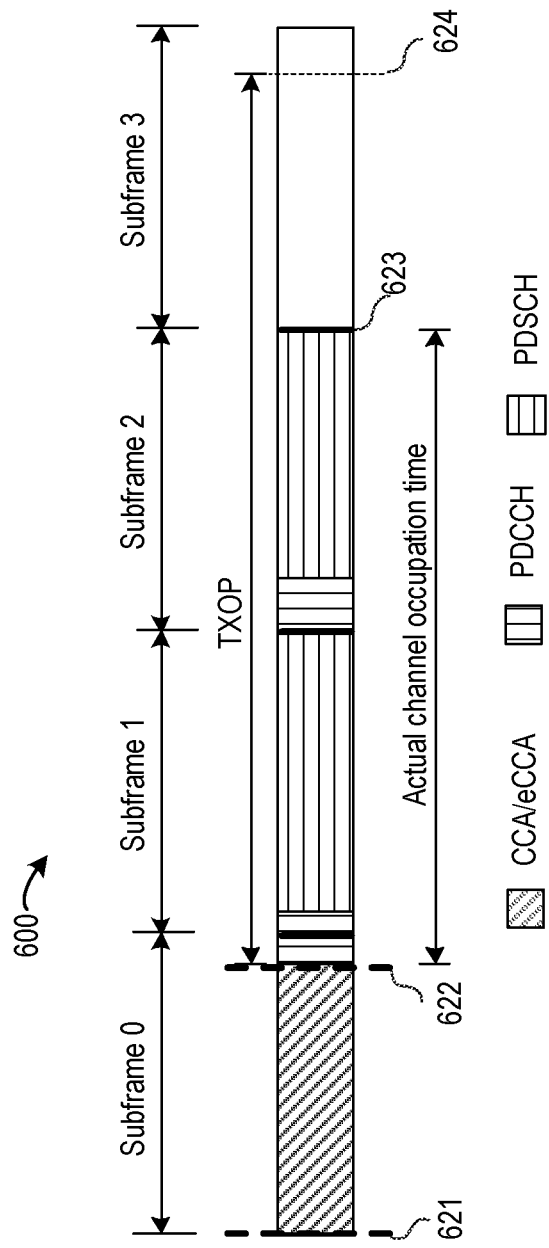
FIG. 6 illustrates a schematic diagram 600 of fractional subframe transmission according to embodiments of the invention.

FIG. 6 illustrates a schematic diagram 600 of subframe-level fractional subframe transmission according to embodiments of the invention. As shown in FIG. 6, there are 4 subframes, i.e., subframes 0 to 3. With respect to subframe 0, there are two potential positions 621 and 622, wherein the first potential position 621 corresponds to the start of subframe 0. CCA/eCCA may start from the first potential position 621, and the potential position 622 may be determined as the target position. The factional subframe transmission then may start from the target position and ends at the end of subframe 2. Thus, the real channel occupation time, which indicates the actual time period occupied by the fractional subframe transmission, may correspond to a time period from the positions 622 to 623. Assuming that TXOP is 3 ms and corresponds to a time period from the position 622 to the position 624, it may be determined that the actual channel occupation time is from the position 622 to the position 623 and a time period from the position 623 to the position 624 is not occupied. In the embodiments of FIG. 6, since the first subframe is subframe 0, the index of the first subframe is 0. Thus, according to equation (2), it may be determined that the index of the last subframe Ne is 0+3−1=2. In other words, the last subframe may be determined as subframe 2.

According to embodiments of the present invention, optionally, if the symbol-level transmission is performed, the method 100 may further comprise a step of comparing the number of end symbols with a predetermined threshold. Responsive to that the number of end symbols is less than or equal to a predetermined threshold, the last subframe may be released. In an alternative embodiment, responsive to that the number of end symbols is less than or equal to a predetermined threshold, the end symbols may be combined with a subframe immediately prior to the last subframe. In the disclosure, the combination of the end symbols and the subframe immediately prior to the last subframe may be referred as to a "super subframe". According to embodiments of the present invention, the predetermined threshold may be set as a fixed value, for example, 3 or a value that is changed dynamically. It is to be understood that the above example embodiments are only for the purpose of illustration, without suggesting any limitations on the subject matter described herein. The predetermined threshold may be implemented in any other suitable ways.

According to embodiments of the present invention, optionally, if the transmitter performs the method 100, the transmitter may determine a transport block size based on the number of end symbols and transmit data of the transport block size in the last subframe. Details may be described with reference to FIG. 2.

According to embodiments of the present invention, optionally, if the receiver performs the method 100, the receiver may determine a transport block size based on the number of end symbols and receive data of the transport block size in the last subframe. Details may be described with reference to FIG. 3.

Reference is now made to FIG. 2, which illustrates a flow chart of a method 200 for performing fractional subframe transmission at a transmitter according to an embodiment of the invention. The method 200 may be considered as a specific implementation of the method 100 described above with reference to FIG. 1 and performed by the transmitter. However, it is noted that this is only for the purpose of illustrating the principles of the present invention, rather than limiting the scope thereof.

Method 200 begins at step S210, a symbol of a first subframe at which the channel becomes available is determined.

According to embodiments of the present invention, whether a channel is available may be determined in several ways, such as energy detection, carrier sensing, and so on. In some embodiments, strength of energy from a further transmitter may be measured on the channel. The further transmitter may be a transmitter that may use the same channel and is different from the transmitter performing the method according to embodiments of the present invention. If the energy strength is not strong, it may be determined that the channel is idle. In this regard, the energy strength may be compared with a strength threshold. In response to that the measured strength is less than the strength threshold, the channel may be determined as being available. The strength threshold may be a predetermined threshold, which may be set according to system requirements, specifications, channel quality, and so on. According to embodiments of the present invention, the strength threshold may be set as a fixed value or a value that is changed dynamically. It is to be understood that the above example embodiments are only for the purpose of illustration, without suggesting any limitations on the subject matter described herein. The strength threshold may be implemented in any other suitable ways.

Alternatively, the channel availability may be detected based on carrier sensing. By way of example, a signalling from a further transmitter may be detected on the channel. The further transmitter may be a transmitter that may use the channel and is different from the transmitter performing the method according to embodiments of the present invention. Based on the signalling, whether the channel is available may be determined. When the transmitter detect a channel becomes available at a symbol, the subframe comprising the symbol may be determined as the first subframe.

It is to be noted although the above embodiments illustrate a further transmitter, there may be a plurality of further transmitters in a communication system according to embodiments of the present invention. In such embodiments, energy detection and carrier sensing may be performed with respect to the plurality of further transmitters.

At step S220, the first temporal information is determined as comprising a potential position immediately prior to the symbol, wherein the potential position is predefined in the first subframe.

In an exemplary embodiment, if the symbol determined at step S210 is symbol 5, and there are three predefined potential positions corresponding to symbols 0, 7 and 11, respectively, the transmitter may determine that the potential position corresponding to symbol 0 is a potential position immediately prior to the current position. As such, at step S220, the first temporal information may comprise the potential position corresponding to symbol 0.

It is to be noted that, in some alternative embodiments, the first temporal information may be determined as comprising an index of the symbol determined at step S210. By way of example, if the symbol determined at step S210 is symbol 5, the first temporal information may be determined as comprising an index of symbol 5. As can be appreciated by those skilled in the art, the first temporal information may comprise an index of the symbol determined at step S210, a potential position immediately prior to the symbol, or any symbol between the symbol determined at step S210 and the potential position immediately prior to the symbol. The above example embodiments are only for the purpose of illustration, without suggesting any limitations on the subject matter described herein.

At step S230, the number of symbols used by the fractional subframe transmission is determined based on the transmission opportunity information.

In some embodiments, the transmission opportunity information may comprise channel occupancy time. In an exemplary embodiment, the channel occupancy time may be 3.5 ms, for example. For a subframe of 1 ms which includes M symbols, for example M=14, it may be determined that 1 symbol may occupy about 0.071 ms. In view of the length of the channel occupancy time and the symbol, for example, by means of dividing the channel occupancy time by 0.071, the transmitter may determine that the number of symbols used by the fractional subframe transmission as 49.

At step S240, the number of end symbols is determined based on the first temporal information and the number of symbols used by the fractional subframe transmission, wherein the end symbols are used by the fractional subframe transmission and belong to a last subframe of the fractional subframe transmission.

As discussed above, the first temporal information may comprise the potential position immediately prior to the symbol determined at step S210. In some embodiments, the last symbol of the fractional subframe transmission may be determined as follows:

$$Se = S1 + TXOP \tag{3}$$

where S1 represents the potential position immediately prior to the symbol determined at step S210, Se represents the index of the last symbol, and TXOP represents the channel occupancy time (for example, how many symbols).

In an exemplary embodiment, S1 is the first symbol (i.e., symbol 0) of the first subframe and TXOP is 49 symbols. Thus, the last symbol may be determined as the 49th symbol of the fractional subframe transmission. If a subframe comprises M symbols, for example M=14, it may be determined that the fractional subframe transmission occupy 4 subframes, wherein the first three subframes are fully occupied and the first seven symbols (symbol 0 to 6) of the last subframe are occupied. According to embodiments of the present invention, the first seven symbols (symbol 0 to 6) of the last subframe may be determined as ending symbols. Accordingly, at step S240, it may be determined that the number of the ending symbols is 7.

At step S250, a transport block size is determined based on the number of end symbols.

The transport block size indicates the size of a data block to be transmitted in the fractional subframe transmission. According to embodiments of the present invention, the transport block size may be determined in various ways. In some embodiments, the end symbols of the last subframe may be considered as available symbols of a fractional subframe. The transmitter may determine a scaling factor associated with the number of the available symbols, and then determine the transport block size based on the scaling factor. The scaling factor may be defined in several ways. Table 1 illustrates an example of scaling factors associated with different numbers of available symbols.

TABLE 1

| Number of available symbols | Scaling factor |
| --- | --- |
| 1, 2, 3 | N/A |
| 4 | 0.25 |
| 5 | 0.25, 0.375 |
| 6 | 0.375 |
| 7 | 0.375, 0.5 |
| 8 | 0.5, 0.75 |
| 9, 10, 11, 12 | 0.75 |
| 13, 14 | 1 |

In some embodiments, if the number of the available symbols is 1, 2 or 3, the transmitter may use the available symbols to transmit control information of the fractional subframe transmission, and may determine that the available symbols are not enough for transmitting data after the transmission of the control information. In this regard, the scaling factor may be designed as a value of "N/A", which indicates that the scaling factor is "not available". In an exemplary embodiment, if the number of the available symbols is 4, the transmitter may determine that the associated scaling factor is 0.25. In an exemplary embodiment, if the number of the available symbols is 5, the transmitter may determine that the associated scaling factor is 0.25 or 0.375. In an exemplary embodiment, if the number of the available symbols is 6, the transmitter may determine that the associated scaling factor is 0.375. In an exemplary embodiment, if the number of the available symbols is 7, the transmitter may determine that the associated scaling factor is 0.375 or 0.5. In an exemplary embodiment, if the number of the available symbols is 8, the transmitter may determine that the associated scaling factor is 0.5 or 0.75. In an exemplary embodiment, if the number of the available symbols is 9, 10, 11 or 12, the transmitter may determine that the associated scaling factor is 0.75. In an exemplary embodiment, if the number of the available symbols is 13 or 14, the transmitter may determine that the associated scaling factor is 1.

In some embodiments, the transport block size may be determined based on the scaling factor in several ways. By way of example, a first resource block number which indicates a number of resource blocks allocated for transmission may be obtained. For the transmitter, the first resource block number may be determined by the transmitter in real time. Then, a second resource block number may be determined based on the first resource block number and the scaling factor. In an exemplary embodiment, the second resource block number may be determined as follows:

$$N_{PRB} = \max\{\lfloor N'_{PRB} \times \text{Factor} \rfloor, 1\} \quad (4)$$

wherein $N'_{PRB}$ represents the first resource block number, $N_{PRB}$ represents the second resource block number, Factor represents the scaling factor.

Based on the second resource block number, the transport block size may be determined. In some embodiments, a transport block size table may be used for determining the transport block size. Table 2 illustrates an exemplary transport block size table.

TABLE 2

| MCS | 1 | 2 | 3 | 4 | 5 | 6 | 7 | 8 | 9 | 10 |
| --- | --- | --- | --- | --- | --- | --- | --- | --- | --- | --- |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 4608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 2496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

The horizontal direction of Table 2 may correspond to a resource block number, for example, the second resource block number in the embodiments, and the vertical direction may correspond to a Modulation and Coding Scheme (MCS). In the embodiments, when the transmitter determines the second resource block number as well as the MCS that is employed currently, it may determine the transport block size by looking up the Table 2 based on the second resource block number and the MCS. By way of example, if the second resource block number is 8, and the MCS is 8 the transport block size may be determined as 1096.

It is to be noted that although the dimension of Table 2 is 10×27, it is simplification of 3GPP TS36.213 whose dimension is 34×110. It is further to be noted that the above example table is only for the purpose of illustration, without suggesting any limitations on the subject matter described herein. Any other suitable table may be used in the determination of the transport block size.

At step S260, data of the transport block size is transmitted in the last subframe.

In some embodiments, the transmitter may transmit other possible information, such as Reference Signal (RS), Primary Synchronous Signal (PSS), Secondary Synchronous Signal (SSS), and so on in data region of the factional subframe transmission, for example, Physical Downlink Shared Channel (PDSCH), if necessary.

Figure 3:
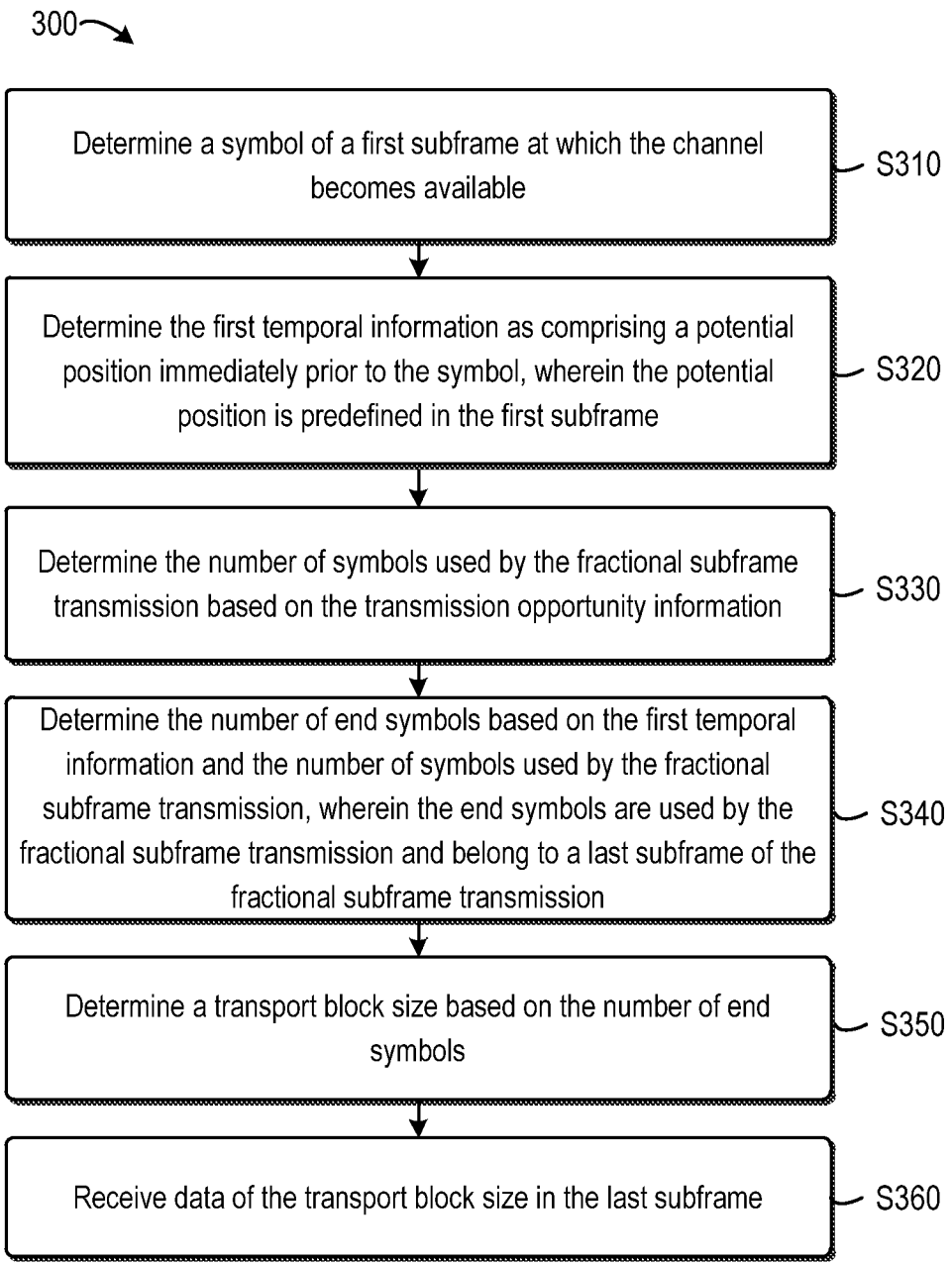
FIG. 3 illustrates a flow chart of a method 300 for performing fractional subframe transmission at a receiver according to an embodiment of the invention.

Reference is now made to FIG. 3, which illustrates a flow chart of a method 300 for performing fractional subframe transmission at a receiver according to an embodiment of the invention. The method 300 may be considered as a specific implementation of the method 100 described above with reference to FIG. 1 and performed by the receiver. However, it is noted that this is only for the purpose of illustrating the principles of the present invention, rather than limiting the scope thereof.

Method 300 begins at step S310, a symbol of a first subframe at which the channel becomes available is determined.

In some embodiments, the transmitter may notify the receiver the first temporal information, for example, the index of the symbol of the first subframe at which a channel becomes available. In an exemplary embodiment, the transmitter may send an indicator regarding the first temporal information to the receiver. In this way, the index of the symbol of the first subframe may be indicated explicitly. Thus, at step S310, the receiver may determine the symbol of the first subframe by detecting the indicator. In an alternative embodiment, the transmitter may not send the indicator, and the receiver may make blind decoding for control information of the fractional subframe transmission at a potential position. In response to that the blind decoding is success, the receiver may determine the symbol of a first subframe at which the channel becomes available.

At step S320, the first temporal information is determined as comprising a potential position immediately prior to the symbol, wherein the potential position is predefined in the first subframe.

In an exemplary embodiment, if the symbol determined at step S320 is symbol 5, and there are three predefined potential positions corresponding to symbols 0, 7 and 11, respectively, the receiver may determine the potential position corresponding to symbol 0 is a potential position immediately prior to the current position. As such, at step S320, the first temporal information may comprise the potential position corresponding to symbol 0.

It is to be noted that, in some alternative embodiments, the first temporal information may be determined as comprising an index of the symbol determined at step S320. By way of example, if the symbol determined at step S320 is symbol 5, the first temporal information may be determined as comprising an index of symbol 5. As can be appreciated by those skilled in the art, the first temporal information may comprise an index of the symbol determined at step S320, a potential position immediately prior to the symbol, or any symbol between the symbol determined at step S320 and the potential position immediately prior to the symbol. The above example embodiments are only for the purpose of illustration, without suggesting any limitations on the subject matter described herein.

At step S330, the number of symbols used by the fractional subframe transmission is determined based on the transmission opportunity information.

In some embodiments, the transmission opportunity information may comprise channel occupancy time. In an exemplary embodiment, the channel occupancy time may be 3.5 ms, for example. For a subframe of 1 ms which includes M symbols, for example M=14, it may be determined that 1 symbol may occupy about 0.071 ms. In view of the length of the channel occupancy time and the symbol, for example, by means of dividing the channel occupancy time by 0.071, the receiver may determine that the number of symbols used by the fractional subframe transmission as 49.

At step S340, the number of end symbols is determined based on the first temporal information and the number of symbols used by the fractional subframe transmission, wherein the end symbols are used by the fractional subframe transmission and belong to a last subframe of the fractional subframe transmission.

As discussed above, the first temporal information may comprise the potential position immediately prior to the symbol determined at step S310. In some embodiments, the receiver may determine the last symbol of the fractional subframe transmission according to equation (3), for example.

At step S350, a transport block size is determined based on the number of end symbols.

The transport block size indicates the size of a data block to be transmitted in the fractional subframe transmission. According to embodiments of the present invention, the transport block size may be determined in various ways. In some embodiments, the end symbols of the last subframe may be considered as available symbols of a fractional subframe. The receiver may determine a scaling factor associated with the number of the available symbols, and then determine the transport block size based on the scaling factor. The scaling factor may be defined in several ways. As discussed above, Table 1 illustrates an example of scaling factors associated with different numbers of available symbols.

In an exemplary embodiment, if the number of the available symbols is 4, the receiver may determine that the associated scaling factor is 0.25. In an exemplary embodiment, if the number of the available symbols is 5, the receiver may determine that the associated scaling factor is 0.25 or 0.375. In an exemplary embodiment, if the number of the available symbols is 6, the receiver may determine that the associated scaling factor is 0.375. In an exemplary embodiment, if the number of the available symbols is 7, the receiver may determine that the associated scaling factor is 0.375 or 0.5. In an exemplary embodiment, if the number of the available symbols is 8, the receiver may determine that the associated scaling factor is 0.5 or 0.75. In an exemplary embodiment, if the number of the available symbols is 9, 10, 11 or 12, the receiver may determine that the associated scaling factor is 0.75. In an exemplary embodiment, if the number of the available symbols is 13 or 14, the receiver may determine that the associated scaling factor is 1.

In some embodiments, the transport block size may be determined based on the scaling factor in several ways. By way of example, a first resource block number which indicates a number of resource blocks allocated for transmission may be obtained. For the receiver, the first resource block number may be notified by the transmitter. Then, a second resource block number may be determined based on the first resource block number and the scaling factor. In an exemplary embodiment, the second resource block number may be determined according to equation (4). Based on the second resource block number, the transport block size may be determined. In some embodiments, a transport block size table, for example Table 2, may be used for determining the transport block size. In particular, if the receiver determines the second resource block number as well as the MCS which is employed currently, it may determine the transport block size by looking up the Table 2.

At step S360, data of the transport block size is received in the last subframe.

In some embodiments, the receiver may receive other possible information, such as Reference Signal (RS), Primary Synchronous Signal (PSS), Secondary Synchronous Signal (SSS), and so on in data region of the factional subframe transmission, for example, Physical Downlink Shared Channel (PDSCH), if necessary.

Figure 4:
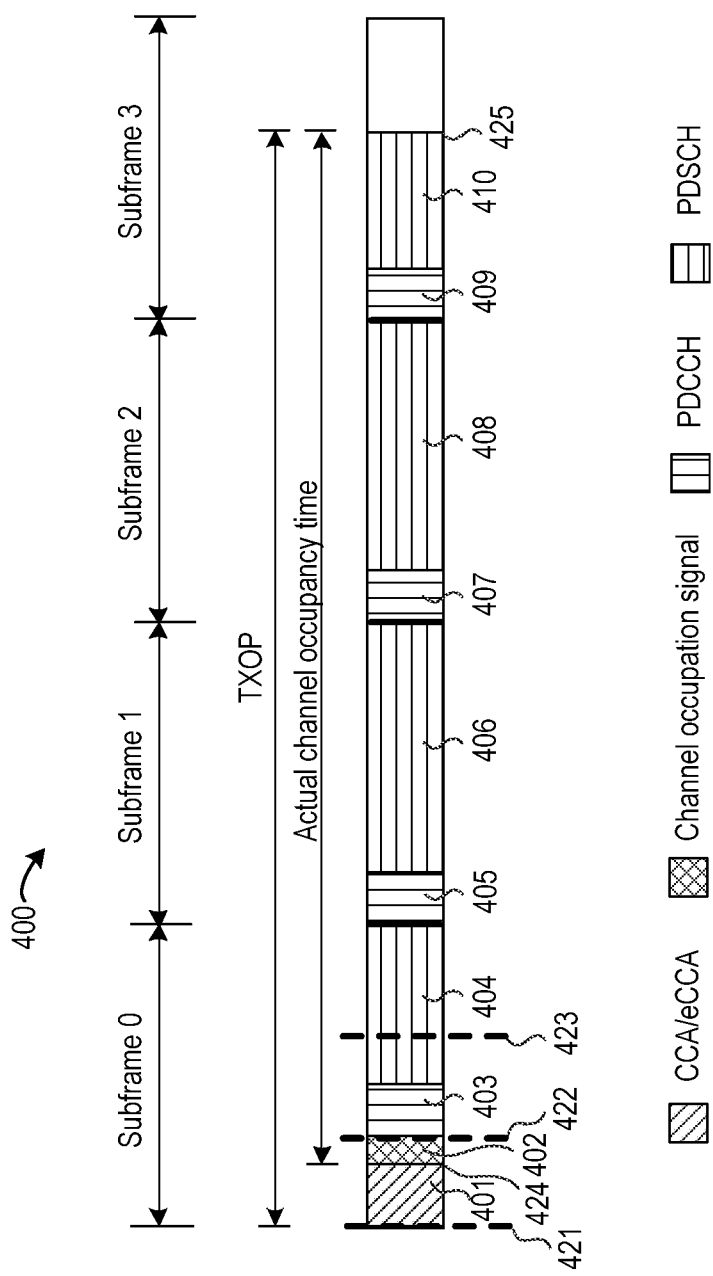
FIG. 4 illustrates a schematic diagram 400 of fractional subframe transmission according to embodiments of the invention.

FIG. 4 illustrates a schematic diagram 400 of fractional subframe transmission according to embodiments of the invention. FIG. 4 exemplarily shows four subframes, subframes 0 to 3. With respect to subframe 0, there are three potential positions 421, 422 and 423, wherein the first potential position 421 corresponds to the start of subframe 0, for example, symbol 0 of subframe 0. CCA/eCCA 401 may start from the first potential position 421. During the CCA/eCCA 401, the transmitter may determine that the channel is available at a position 424. Since the position 424 is not a potential position, the transmitter may transmit channel occupation signals from the position 424 until a potential position, for example, the potential position 422, and determine the potential position 422 as the target position. The factional subframe transmission then may start from the target position, wherein control information may be transmitted on Physical Downlink Control Channel (PDCCH) at time periods 403, 405, 407 and 409, and data may be transmitted on PDSCH at time periods 404, 406, 408 and 410. As shown, the factional subframe transmission ends at a position 425.

Figure 5:
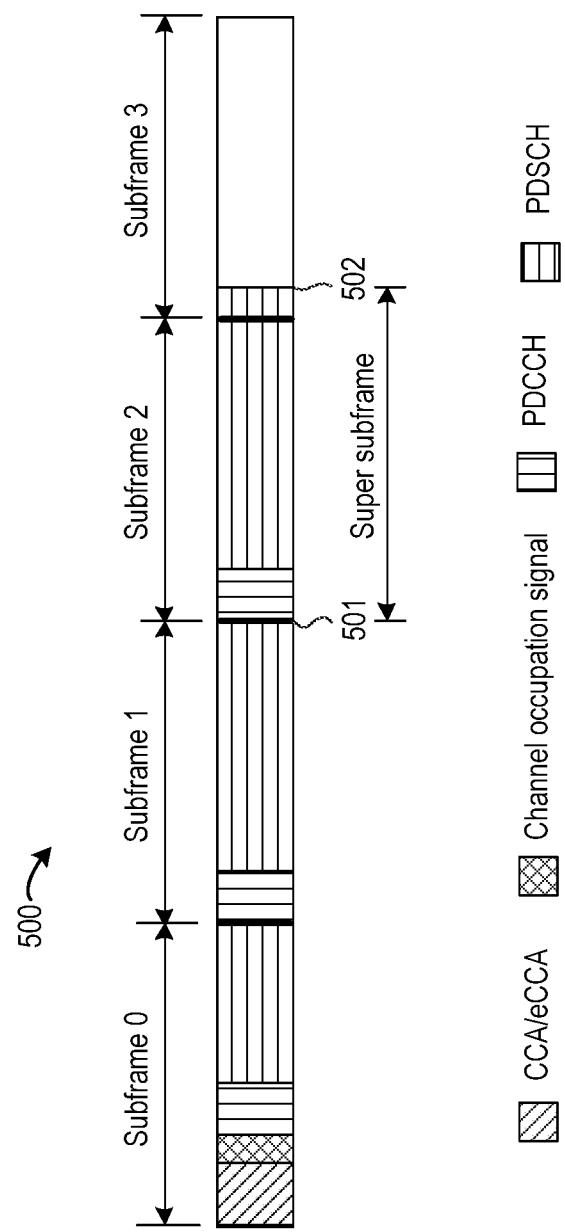
FIG. 5 illustrates a schematic diagram 500 of fractional subframe transmission according to embodiments of the invention.

As shown in FIG. 4, the symbol of a first subframe at which the channel becomes available may be determined as a symbol corresponding to the position 424. Since the potential position immediately prior to the determined symbol is the potential position 421, it may be determined that the channel occupation time starts at the potential position 421. Assuming the transmission opportunity information comprises TXOP of 3.5 ms, it may be determined that the number of symbols used by the fractional subframe transmission is 49. As illustrated by FIG. 5, the TXOP corresponds to a time period from the position 421 to the position 425, and the actual channel occupation time is from the position 424 to the position 425. Thus, a time period from the position 421 to the position 424 is not occupied. Then, based on the potential position 421 and the number of symbols used by the fractional subframe transmission, the end symbols may be determined as the first seven symbols of subframe 3, and the number of the end symbols is 7. In this way, the end of the fractional subframe transmission can be estimated.

According to embodiments of the present invention, optionally, the method 200 or 300 may further comprise a step of comparing the number of end symbols with a predetermined threshold. Responsive to that the number of end symbols is less than or equal to a predetermined threshold, the last subframe may be released. In an alternative embodiment, responsive to that the number of end symbols is less than or equal to a predetermined threshold, the end symbols may be combined with a subframe immediately prior to the last subframe as a super subframe. The super subframe is exemplarily shown in FIG. 5, which illustrates a schematic diagram 500 of fractional subframe transmission according to embodiments of the invention. As shown in FIG. 5, there are four subframes, subframe 0 to 3. Since the number of end symbols of the last subframe (subframe 3) is less than the predetermined threshold, for example, 3, the end symbols may be combined with subframe 2 as a super subframe. As shown, the super subframe may correspond to a time period from the start of subframe 2 501 to the last one of the end symbols 502.

Figure 7:
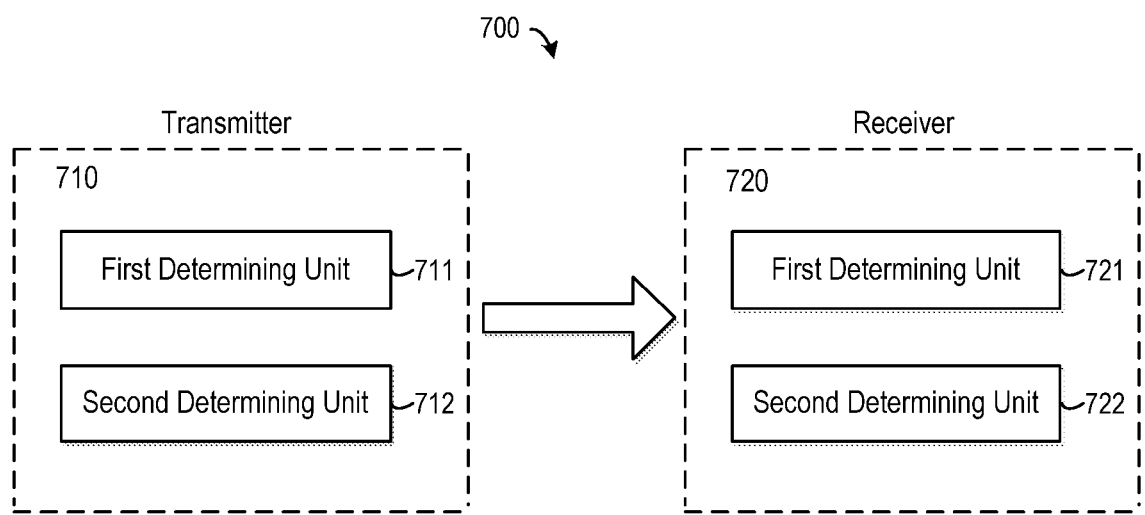
FIG. 7 illustrates a block diagram of an apparatus 710 of a transmitter and an apparatus 720 of a receiver for performing fractional subframe transmission according to embodiments of the invention.

FIG. 7 illustrates a block diagram of an apparatus 710 of a transmitter and an apparatus 720 of a receiver for performing fractional subframe transmission according to embodiments of the invention. As shown in FIG. 7, the apparatus 710 may transmit data in a fractional subframe to the apparatus 720. According to embodiments of the present invention, the apparatus 710 may be implemented in the transmitter or may be coupled with the transmitter in any suitable way. Similarly, the apparatus 720 may be implemented in the receiver or may be coupled with the receiver in any suitable way.

As shown, the apparatus 710 comprises: a first determining unit 711 configured to determine first temporal information that indicates when a channel becomes available; and a second determining unit 712 configured to determine, based on the first temporal information and transmission opportunity information, second temporal information that indicates an end of the fractional subframe transmission.

According to embodiments of the present invention, the first determining unit 711 may comprise: a first symbol determining unit configured to determine a symbol of a first subframe at which the channel becomes available; and a first information determining unit configured to determine determining the first temporal information as comprising an index of the symbol.

According to embodiments of the present invention, the first determining unit 711 may comprise: a second symbol determining unit configured to determine a symbol of a first subframe at which the channel becomes available; and a second information determining unit configured to determine the first temporal information as comprising a potential position immediately prior to the symbol, wherein the potential position is predefined in the first subframe.

According to embodiments of the present invention, the second determining unit 712 may comprise: a first number determining unit configured to determine a number of symbols used by the fractional subframe transmission based on the transmission opportunity information; and a second number determining unit configured to determine a number of end symbols based on the first temporal information and the number of symbols used by the fractional subframe transmission, wherein the end symbols are used by the fractional subframe transmission and belong to a last subframe of the fractional subframe transmission.

According to embodiments of the present invention, the apparatus 710 may further comprise a comparing unit configured to compare the number of end symbols with a predetermined threshold; and a processing unit configured to, responsive to that the number of end symbols is less than or equal to a predetermined threshold, release the last subframe, or combine the end symbols with a subframe immediately prior to the last subframe.

According to embodiments of the present invention, the apparatus 710 may further comprise a first size determining unit configured to determine a transport block size based on the number of end symbols; and a transmitting unit configured to transmit data of the transport block size in the last subframe.

According to embodiments of the present invention, the first determining unit 711 may comprise: a first subframe determining unit configured to determine a first subframe at which the channel becomes available; and a third information determining unit configured to determine the first temporal information as comprising an index of the first subframe.

According to embodiments of the present invention, the second determining unit 712 may comprise: a last subframe determining unit configured to determine, based on the first temporal information and transmission opportunity information, an index of a last subframe used by the fractional subframe transmission.

As shown, the apparatus 720 comprises: a first determining unit 721 configured to determine first temporal information that indicates when a channel becomes available; and a second determining unit 722 configured to determine, based on the first temporal information and transmission opportunity information, second temporal information that indicates an end of the fractional subframe transmission.

According to embodiments of the present invention, the first determining unit 721 may comprise: a first symbol determining unit configured to determine a symbol of a first subframe at which the channel becomes available; and a first information determining unit configured to determine determining the first temporal information as comprising an index of the symbol.

According to embodiments of the present invention, the first determining unit 721 may comprise: a second symbol determining unit configured to determine a symbol of a first subframe at which the channel becomes available; and a second information determining unit configured to determine the first temporal information as comprising a potential position immediately prior to the symbol, wherein the potential position is predefined in the first subframe.

According to embodiments of the present invention, the second determining unit 722 may comprise: a first number determining unit configured to determine a number of symbols used by the fractional subframe transmission based on the transmission opportunity information; and a second number determining unit configured to determine a number of end symbols based on the first temporal information and the number of symbols used by the fractional subframe transmission, wherein the end symbols are used by the fractional subframe transmission and belong to a last subframe of the fractional subframe transmission.

According to embodiments of the present invention, the apparatus 720 may further comprise a comparing unit configured to compare the number of end symbols with a predetermined threshold; and a processing unit configured to, responsive to that the number of end symbols is less than or equal to a predetermined threshold, release the last subframe, or combine the end symbols with a subframe immediately prior to the last subframe.

According to embodiments of the present invention, the apparatus 720 may further comprise a first size determining unit configured to determine a transport block size based on the number of end symbols; and a receiving unit configured to receive data of the transport block size in the last subframe.

According to embodiments of the present invention, the first determining unit 721 may comprise: a first subframe determining unit configured to determine a first subframe at which the channel becomes available; and a third information determining unit configured to determine the first temporal information as comprising an index of the first subframe.

According to embodiments of the present invention, the second determining unit 722 may comprise: a last subframe determining unit configured to determine, based on the first temporal information and transmission opportunity information, an index of a last subframe used by the fractional subframe transmission.

It is also to be noted that the apparatuses 710 and 720 may be respectively implemented by any suitable technique either known at present or developed in the future. Further, a single device shown in FIG. 7 may be alternatively implemented in multiple devices separately, and multiple separated devices may be implemented in a single device. The scope of the present invention is not limited in these regards.

It is noted that the apparatus 710 may be configured to implement functionalities as described with reference to FIGS. 1 and 2, and the apparatus 720 may be configured to implement functionalities as described with reference to FIG. 1 or 3. Therefore, the features discussed with respect to the method 100 or 200 may apply to the corresponding components of the apparatus 710, and the features discussed with respect to the method 100 or 300 may apply to the corresponding components of the apparatus 720. It is further noted that the components of the apparatus 710 or the apparatus 720 may be embodied in hardware, software, firmware, and/or any combination thereof. For example, the components of the apparatus 710 or the apparatus 720 may be respectively implemented by a circuit, a processor or any other appropriate device. Those skilled in the art will appreciate that the aforesaid examples are only for illustration not limitation.

In some embodiment of the present disclosure, the apparatus 710 or the apparatus 720 may comprise at least one processor. The at least one processor suitable for use with embodiments of the present disclosure may include, by way of example, both general and special purpose processors already known or developed in the future. The apparatus 710 or the apparatus 720 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 710 to at least perform according to the method 100 or 200 as discussed above, or to cause the apparatus 720 to at least perform according to the method 100 or 300 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 1-3 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method performed by a User Equipment (UE), the method comprising:
    communicating with a base station; and
    receiving from the base station, on an unlicensed spectrum, a downlink transmission from a target position, wherein the target position is one of a plurality of predetermined possible starting positions within a first subframe of the downlink transmission,
    wherein the plurality of predetermined possible starting positions corresponds to symbols that mutually are spaced with an interval of a plurality of symbols.

2. The method of claim 1, wherein the plurality of periodical symbols predetermined possible starting positions corresponds to symbols 0 and 7.

3. The method of claim 1, wherein neither a control channel nor a data channel is transmitted in the first 7 symbols in the first subframe.

4. The method of claim 1, wherein the downlink transmission occupies one or more consecutive subframes, and a subframe of the one or more consecutive subframes comprises symbols used for transmission while other symbols in the subframe are not occupied.

5. The method of claim 1, further comprising:
    receiving an indicator at the target position, the indicator indicating an ending symbol of the downlink transmission.

6. A method performed by a base station, the method comprising:
    communicating with a User Equipment (UE); and
    transmitting to the UE, on an unlicensed spectrum, a downlink transmission from a target position, wherein the target position is one of a plurality of predetermined possible starting positions within a first subframe of the downlink transmission,
    wherein the plurality of predetermined possible starting positions corresponds to symbols that mutually are spaced with an interval of a plurality of symbols.

7. The method of claim 6, wherein the plurality of predetermined possible starting positions corresponds to symbols 0 and 7.

8. The method of claim 6, wherein neither a control channel nor a data channel is transmitted in the first 7 symbols in the first subframe.

9. The method of claim 6, wherein the downlink transmission occupies one or more consecutive subframes, and a subframe of the one or more consecutive subframes comprises symbols used for transmission while other symbols in the subframe are not occupied.

10. The method of claim 6, further comprising:
    transmitting an indicator at the target position, the indicator indicating an ending symbol of the downlink transmission.

11. A User Equipment (UE) comprising a transceiver configured to:
- communicate with a base station; and
- receive from the base station, on an unlicensed spectrum, a downlink transmission from a target position, wherein the target position is one of a plurality of predetermined possible starting positions within a first subframe, wherein the plurality of predetermined possible starting positions corresponds to symbols that mutually are spaced with an interval of a plurality of symbols.

12. The UE of claim 11, wherein the plurality of predetermined possible starting positions corresponds to symbols 0 and 7.

13. The UE of claim 11, wherein neither a control channel nor a data channel is transmitted in the first 7 symbols in the first subframe.

14. The UE of claim 11, wherein the downlink transmission occupies one or more consecutive subframes, and a subframe of the one or more consecutive subframes comprises symbols used for transmission while other symbols in the subframe are not occupied.

15. The UE of claim 11, wherein the transceiver is further configured to
- receive an indicator at the target position, the indicator indicating an ending symbol of the downlink transmission.

* * * * *